United States Patent [19]

Grimm et al.

[11] Patent Number: 5,409,290

[45] Date of Patent: Apr. 25, 1995

[54] RIGID LID FOR THE ROOF OPENING OF A VEHICLE

[75] Inventors: Rainer Grimm, Wetzlar; Horst Böhm, Frankfurt, both of Germany

[73] Assignee: Rockwell Golde GmbH, Germany

[21] Appl. No.: 145,911

[22] Filed: Oct. 29, 1993

[30] Foreign Application Priority Data

Nov. 17, 1992 [DE] Germany .................. 42 38 714.0

[51] Int. Cl.⁶ .............................................. B60J 7/00
[52] U.S. Cl. .................................. 296/215; 296/201; 296/216; 264/229; 49/501; 428/192; 52/204.597
[58] Field of Search ............... 296/215, 216, 218, 201, 296/146.16; 264/263, 229, 277; 49/501; 428/192; 156/108; 52/204.62, 204.71, 776, 400

[56] References Cited

U.S. PATENT DOCUMENTS

| | | | |
|---|---|---|---|
| 4,537,442 | 8/1985 | Jardin | 296/213 X |
| 4,834,931 | 5/1989 | Weaver | 264/277 |
| 5,050,928 | 9/1991 | Bohm et al. | 296/216 |

FOREIGN PATENT DOCUMENTS

| | | | |
|---|---|---|---|
| 3714029 | 11/1987 | Germany | 296/218 |
| 9016831 | 3/1992 | Germany . | |

*Primary Examiner*—Dennis H. Pedder

[57] ABSTRACT

In a glass lid (1) for a vehicle roof opening, the glass pane (2) is provided in its edge zone all around with a cast-on or foamed-on plastics border (3). At least at the longer sides of the glass pane (2), curved correspondingly to the roof curvature, stiffening profiles (4, 5) of steel, supporting the glass pane from below, are embedded into the border (3). The stiffening profiles (4, 5) have, before embedding, a curvature different from that of the glass pane and, in the completed lid (1), are elastically bent corresponding to the curvature of the glass pane so that they are embedded with prestress in the border (3), in order to counteract uplift forces acting upon the lid (1) while the vehicle is travelling, in the sense of maintaining the shape of the lid (1).

6 Claims, 2 Drawing Sheets

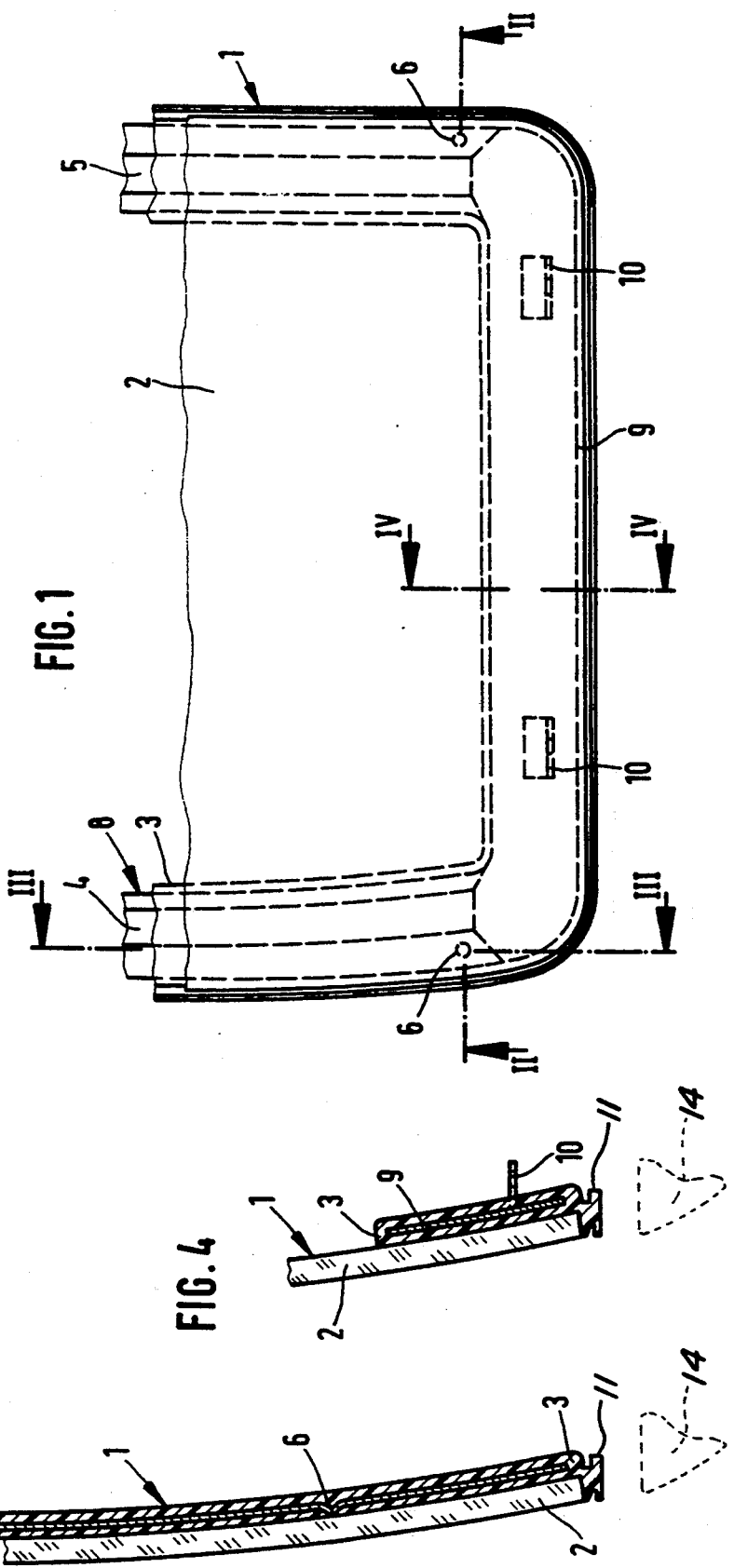

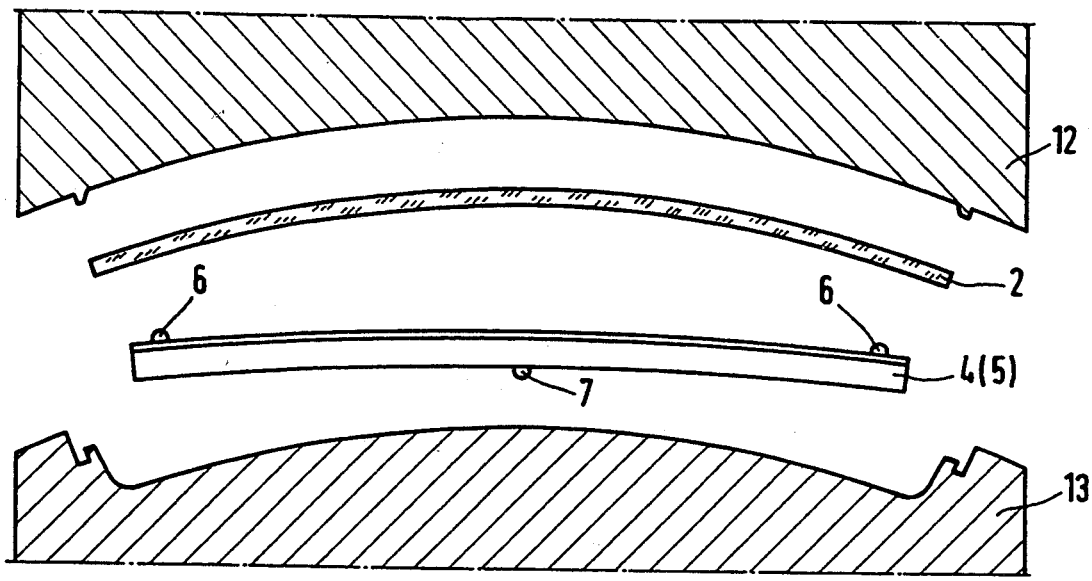
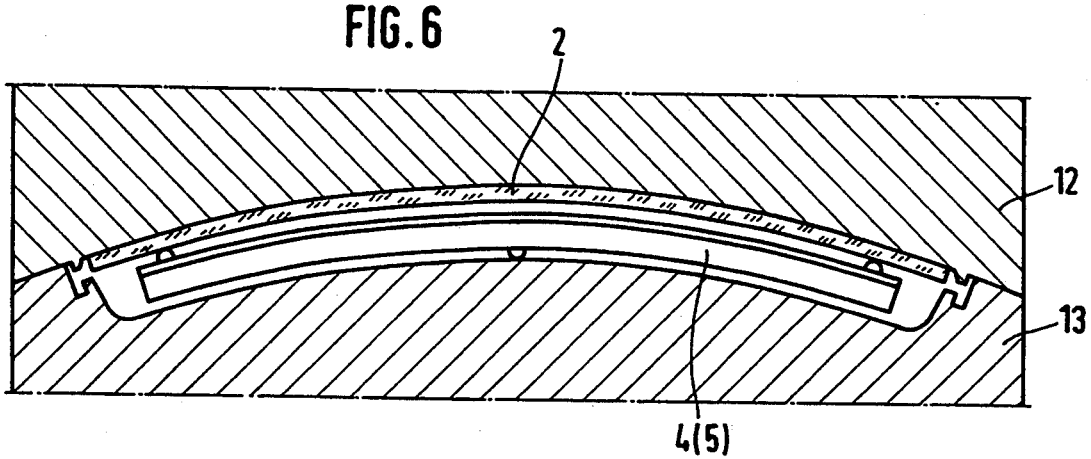
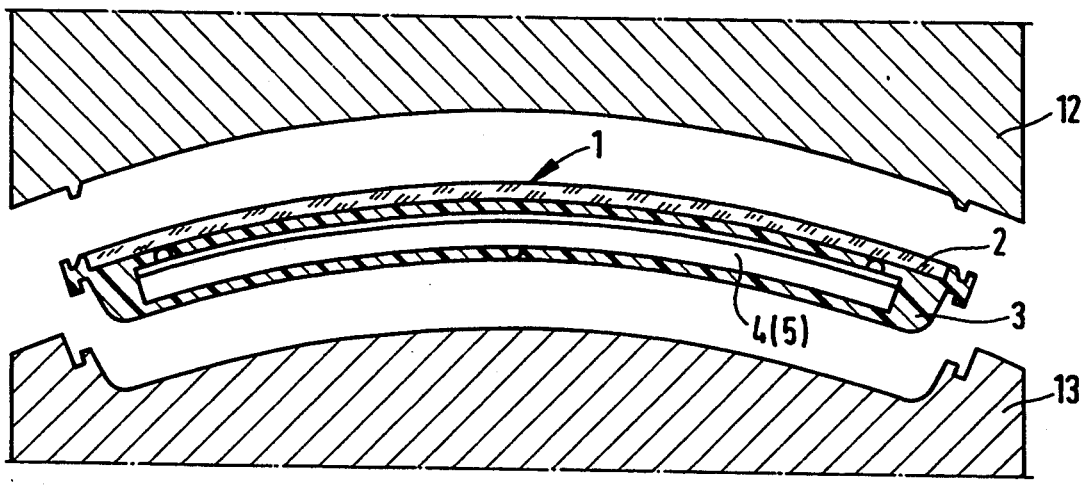

RIGID LID FOR THE ROOF OPENING OF A VEHICLE

FIELD OF THE INVENTION

This invention relates to a rigid cover or lid for the roof opening of a vehicle and a method of forming such a cover or lid. The rigid lid may find applications, within the framework of the invention, for all known types of automobile roofs, such as sliding roofs, sliding-lifting roofs, upper ridge sliding roofs and simple, front-hinged ventilation flaps, in which the rigid lid may be constructed to be sliding, pivotal or additionally removable.

BACKGROUND OF THE INVENTION

Glass lids of the above type completely fill the roof opening with all-round sealing in the closed position of the roof. When the vehicle is travelling, uplift forces that increase with increasing vehicle velocity act upon the glass lid. Because the lid is normally held only at its longitudinal sides at the sliding elements that engage into the guide rails fixed to the vehicle bodywork, it can bulge upwards above the roof contour as a result of these uplift forces. The arched form leads, especially at the front and rear edges of the roof opening because of the step formed there, to wind noise. Furthermore, the arched form of the lid leads to disadvantageous oblique settings of the lid holding and actuating elements at the connection points between the lateral edges of the lid and the guide rails. A dimensional increase in stiffening profiles attached to the lid to strengthen the lid cannot on its own guarantee adequate lid stability against the uplift forces in spite of a form-fitting and force-transmitting connection of stiffening profiles and glass pane to a cast-on or foamed-on lid border of plastics.

Furthermore, the maintenance of a lid curvature to correspond with the roof curvature, especially transverse roof curvature, is influenced by the different expansion behaviours of the glass pane and of stiffening profiles made of steel, resulting from heat produced in the casting-on or foaming-on of the plastics border in the mould and the subsequent cooling, after the finished lid has been removed from the mould.

In one known sliding roof of glass (G 90 16 831.3), of the above kind, it is proposed to form the reinforcing profiles of glass fibre, where the glass fibre may be constituted from long fibres, which can be bonded with a polyester resin to form the reinforcing profile. If glass fibre of this type is used for producing the reinforcing profiles, these profiles will be sufficiently stiff, so as to strengthen the lid, and because the glass fibre has the same coefficient of expansion as the glass pane, there will be no problem due to any difference in stress. On the other hand, however, the use of stiffening profiles made from steel is to be preferred, because the modulus of elasticity of steel is about three times that of glass fibre. For the purposes of this invention, however, not only steel is a suitable material, but also other metals which have a comparable elastic modulus.

The principal object of the present invention therefore is to provide a rigid lid for the roof opening of a vehicle, which shall retain its curvature adapted to the roof curvature even when uplift forces act upon it, and independently of the ambient temperatures that exist.

SUMMARY OF THE INVENTION

In accordance with the invention the lid is formed as a glass pane around the periphery of which is a plastics border into which metal stiffening profiles are embedded. The profiles before embedding have a different curvature in their longitudinal direction from that of the glass pane. Furthermore, the stiffening profiles are bent elastically to a curvature generally corresponding to that of the glass pane, before the plastics border is fitted. Finally, the stiffening profiles, after the border of plastics material is fitted, are embedded in the border with prestress. The rigid lid thus has a curvature adapted to the roof curvature and possesses stiffening profiles embedded into the edge plastics material which, because of their prestress, ensure that the curvature of the lid remains approximately equal under all operating states and temperature influences. The prestress forces of the stiffening profiles act in a direction opposite to that of the uplift.

In accordance with another aspect of the invention there is provided a method of forming a rigid lid for a roof opening of a vehicle comprising the steps of:
(a) providing a two part mould the parts of which are closable onto each other and at lease one part being recessed so that on closure a moulding space is defined by the parts, placing a glass pane into said moulding space,
(c) placing elongate stiffening profiles of a curvature in their longitudinal direction that is different from that of said glass pane into said moulding space adjacent said glass pane,
(d) closing said mould parts so that said profiles are brought to bear against said glass pane under stress, and
(e) enclosing said profiles with plastics material within said mould along a border edge zone of said pane.

The arrangement is preferably such that the glass pane not yet provided with the plastics border has a curvature corresponding approximately to the curvature of the automobile roof into which the lid is to be fitted, whereas the curvature of the not yet embedded stiffening profiles is flatter. It will be seen that a bending of the more flatly curved stiffening profiles into the form of the more strongly curved glass pane leads to a permanent prestress of the stiffening profiles after they have been embedded in this bent position.

In an embodiment of the invention bearing projections are fitted approximately at the ends of the stiffening profiles, which projections bear from below against the glass pane, while approximately at the centre of each of the stiffening profiles a downwardly pointing bearing projection is fitted. While the bearing projections of the stiffening profiles provided at the ends bear directly against the glass pane, the downwardly pointing bearing projections at the centre bear against the lower part of the casting or foaming mould. In this manner the bearing projections not only ensure a corresponding bending of the stiffening profiles to make the curvatures equal, but also create distances between, on the one hand the glass pane and the stiffening profiles, and on the other hand the stiffening profiles and the lower parts of the moulds, so that the plastics uniformly surrounds and envelops the stiffening profiles on all sides. The downwardly orientated, central bearing projections of the stiffening profiles could, of course, alternatively be fitted with the same effect in the centre of the lower mould portion, opposite the stiffening profiles.

The arrangement may favourably be such that the curved stiffening profiles are the transverse members of a single-piece stiffening frame.

Further details of the invention are explained more fully by reference to the drawings, which illustrate on the one hand an example of embodiment thereof and on the other hand the production process. The Figures in the drawings show:

FIG. 1: a cut-away plan of a lid of the present invention,

FIG. 2: the longitudinal section through the lid, along the section line II—II in FIG. 1, and broken approximately in the middle, FIG. 3: the transverse section through the lid, along the section line III—III in FIG. 1, and partly cut away, FIG. 4: the partial cross-section through the lid, on the section line IV—IV in FIG. 1, FIG. 5: a cross-section through an open casting or foaming mould, showing a glass pane for the lid of FIG. 1 "floating" between lower and upper parts of the mould, and a relatively more flatly curved stiffening profile, FIG. 6: a cross-section through the closed mould of FIG. 5 ready for receiving the plastics material, showing the glass pane bearing over its surface against the mould upper part, and the stiffening profile, clamped between glass pane and mould lower part and bent generally to the curvature of the glass pane, and FIG. 7: a cross-section similar to FIG. 5 through the reopened mould, showing the finished lid "floating" between lower part and upper part of the mould.

DETAILED DESCRIPTION

In the drawings, FIGS. 2 to 4 are to a larger scale than FIG. 1. FIGS. 5 to 7, showing the sequential production operation, are basically only of schematic nature. Here the curvatures are exaggerated in the interests of the explanation.

In FIGS. 1 to 4, which illustrate a finished, rigid lid, there are shown a lid i a glass pane 2, a border 3 of plastics material surrounding the peripheral edge zone of the glass pane 2 in the form of a frame, stiffening profiles 4 and 5, embedded in the border 3 and supporting the glass pane 2 from below, bearing projections 6 and 7 projecting from the stiffening profiles 4, 5 on opposite sides, and finally a stiffening 8, which integrates the stiffening profiles 4, 5 together. The roof line of the vehicle is shown as dashed line 14 in FIGS. 3 and 4.

The lid 1 possesses, so as to adapt it to a roof opening of a vehicle, not illustrated here, generally the shape of a rectangle, the longer sides of which extend transversely to the longitudinal axis of the vehicle. The lid 1 is adapted in its longer, transverse extent, to the transverse curvature of the roof of the vehicle. The lid 1 may also, of course, if desired be adapted also with its shorter extent to the curvature of the vehicle roof present at the roof opening, although in modern vehicles the roofs are substantially more curved in the transverse direction than in the longitudinal direction of the vehicle. If, therefore, only the stiffening profiles 4,5 extending in the transverse direction of the vehicle are described here in their special construction, stiffening profiles correspondingly formed in principle may, however, also be embedded in the border 3 of plastics material in the longitudinal direction of the vehicle at the shorter sides of the lid 1. In the example illustrated, the connecting profiles 9, which complement the stiffening profiles 4,5 to form the single-piece stiffening frame 8, can be constructed similarly to the stiffening profiles 4,5, that is before being embedded into the border 3 they have a curvature differing from that of the glass pane 2.

On the connecting profiles 9 there are downwardly pointing lugs 10, projecting out of the border 3, which are provided for connecting the lid 1 to the guide and functional elements of the roof construction, not illustrated here. In the example shown, at the outer periphery of the border 3, a fixing element 11 of generally T-shaped cross-section is integrally moulded on, which serves to receive and return an edge gap sealing profile (not shown). The stiffening profiles 4,5 are each formed as a U-section profile upwardly open approximately in the central zone, the vertical flanges of which are each bent over to a flange parallel to the web of the U-section. The bearing projections 6 may, as shown, be formed in one of the parallel flanges or in both of the parallel flanges.

The production of the above-described lid 1 is now explained with reference to FIGS. 5 to 7. Into the mould, opened as in FIG. 5, glass pane 2 is placed in an upper mould part 12 and stiffening profiles 4 and 5 in a mould lower pare 13, and are so orientated and fixed relative to each other that the glass pane 2 bears completely and over its area against the curved mould contour of the mould upper part 12, whereas the stiffening profiles 4 and 5 bear with their bearing projections 7 against the curved mould surface of the mould lower part 13.

When the mould upper part 12 and lower part 13 are brought towards each other in the closing operation, the stiffening profiles 4 and 5 are bent so that, when the mould is fully closed (FIG. 7), they are at least approximately parallel in their curvature to the curvature of the glass pane 2. This prestresses the stiffening profiles. The lateral bearing projections 6 on the stiffening profiles 4 and 5 now bear against the glass pane 2 from below and act as spacers, so that a spacing exists between the upper face of the stiffening profiles 4, 5 and the edge region of the lower face of the glass pane.

In the succeeding moulding-on or foaming-around operation the glass pane 2 is provided all around in its edge zone with a single-piece, peripheral border 3 of plastics material, preferably polyurethane, according to the form of the mould. The stiffening profiles 4,5 are now completely encased in the plastics material. After cooling, the glass pane, the stiffening profiles 4,5, stiffening frame 8 and the plastics border 3 constitute a single-piece rigid lid 1, the elastic prestress generated by the bending of the stiffening profiles 4,5 being permanently maintained.

This prestress in the stiffening profiles 4,5 has a tendency to flatten the transverse curvature of the lid 1, with the result that an excessive arching of the glass pane under the influence of uplift forces is counteracted. As a result, in this manner a rigid lid is created, which is stable in form against uplift forces and also over a wide range of temperature.

Whereas this invention is herein illustrated and described with respect to one embodiment hereof, it should be realised that various changes may be made within the scope of the appended claims and such as are amplified by this description, without departing from the essential contributions to the art made by the teachings hereof.

We claim:
1. A rigid lid for a roof opening of a vehicle comprising in combination:
   (a) a glass pane having a first curvature from one lateral side to an opposed lateral side,
   (b) a border of plastics material mounted onto a peripheral zone on one face of said pane adjacent at least said lateral sides,
   (c) at least a pair of elongate prestressed stiffening profile members of metal each extending along and moulded within said border, one of such pair of members adjacent said one lateral side and the other of said pair adjacent said opposed side,
   (d) the prestressing of said members being effected before moulding within said border by forming said members in their longitudinal direction with a second curvature different to said pane's first curvature.

2. A lid as claimed in claim 1 wherein said second curvature is flatter than said first curvature.

3. A lid as claimed in claim 1 wherein each elongate end portion of each said member is provided with a first projection extending in a first direction toward said one face of said pane, each said first projection bearing against said face, and wherein between said elongate end portions in a centre portion of each said member a second projection is provided extending in a second direction opposite said first direction.

4. In a vehicle having a roof curved in at least one of the transverse and longitudinal directions of the vehicle, said roof having an opening and a lid positioned in said opening, the improvement comprising:
   (a) a curved rigid glass, pane forming the lid and having a first curvature from one lateral side to an opposed lateral side;
   (b) a border of plastic material moulded onto a peripheral zone on one face of said pane adjacent at least said lateral sides;
   (c) at least a pair of elongate prestressed stiffening profile members of metal each extending along and moulded within said border, one of such pair of members adjacent said one lateral side and the other of said pair adjacent said opposed lateral side; and
   (d) the prestressing of said profile members being effected before moulding within said border by forming said profile members in their longitudinal direction with a second curvature different to said pane's first curvature.

5. A vehicle as claimed in claim 4 wherein said glass pane has a curvature corresponding to the curvature of the vehicle roof.

6. A vehicle as claimed in clam 4 wherein said stiffening profile members extend transversely to said roof, said members forming a part of a frame.

* * * * *